(12) United States Patent
Oyama et al.

(10) Patent No.: US 8,696,072 B2
(45) Date of Patent: *Apr. 15, 2014

(54) SHUT-OFF VALVE FOR HYDRAULIC SYSTEM

(75) Inventors: Hiroki Oyama, Summerfield, NC (US); Michael Joseph Boland, Clemmons, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 12/902,456

(22) Filed: Oct. 12, 2010

(65) Prior Publication Data
US 2012/0085601 A1 Apr. 12, 2012

(51) Int. Cl.
*B60T 8/38* (2006.01)

(52) U.S. Cl.
USPC .......................................... 303/117.1; 188/345

(58) Field of Classification Search
USPC ............. 137/625.69, 625.67, 625.66, 625.27; 188/345, 151 R; 303/126, 145, 191, 303/117.1, 40, 41, 45; 244/99.6, 99.7
See application file for complete search history.

(56) References Cited

U.S. PATENT DOCUMENTS

| | | | | |
|---|---|---|---|---|
| 3,502,374 A | * | 3/1970 | Billeter | 303/69 |
| 3,617,097 A | * | 11/1971 | Grabb | 303/13 |
| 3,742,970 A | | 7/1973 | Gross | |
| 4,072,011 A | | 2/1978 | Ewald | |
| 4,120,540 A | | 10/1978 | Devlieg | |
| 4,198,102 A | | 4/1980 | DeVlieg | |
| 4,685,748 A | | 8/1987 | Zoerb | |
| 4,821,774 A | | 4/1989 | Chorkey | |
| 4,995,677 A | | 2/1991 | Matsuda | |
| 5,094,512 A | | 3/1992 | Kohno et al. | |
| 5,103,866 A | | 4/1992 | Foster | |
| 5,628,550 A | | 5/1997 | Zaviska et al. | |
| 5,826,952 A | | 10/1998 | Feigel et al. | |
| 6,634,722 B1 | | 10/2003 | Zheng et al. | |
| 6,672,688 B2 | | 1/2004 | Gale et al. | |
| 2002/0084692 A1 | | 7/2002 | Arwine et al. | |
| 2009/0242694 A1 | | 10/2009 | Oyama | |

OTHER PUBLICATIONS

International Search Report and Written Opinion of PCT/US2011/055574 dated Feb. 24, 2012.

* cited by examiner

*Primary Examiner* — Xuan Lan Nguyen

(74) *Attorney, Agent, or Firm* — Rankin, Hill & Clark LLP

(57) ABSTRACT

A hydraulic system for an aircraft includes a master cylinder, a wheel brake, a pressure supply, a reservoir, and a shut-off valve in communication with the master cylinder, the wheel brake, the pressure supply and the reservoir. The shut-off valve can include a seal that is configured to preclude fluid flow between the pressure supply and the reservoir through the valve. The shut-off valve can be operable in a first position which blocks fluid flow between the pressure supply and the wheel brake through the valve and a second position which allows fluid flow between the pressure supply and the wheel brake through the valve. Fluid pressure from the master cylinder can control operation of the valve between the first position and the second position. Failure of the seal can result in fluid flow from the brake pressure supply toward the master cylinder.

6 Claims, 2 Drawing Sheets

SHUT-OFF VALVE FOR HYDRAULIC SYSTEM

BACKGROUND

This disclosure is related to a shut-off valve and a hydraulic system. The shut-off valve and the hydraulic system will be described for use in an aircraft; however, the shut-off valve is amenable to other applications. Small business jets use an electrical motor driven pump to operate flight control devices such as aileron, elevator, and rudders. Small jets typically include a power system to operate devices that control landing gear retraction and extension, wheel brakes, nose wheel steering, and a speed brake which is a secondary system of the aircraft.

Because of using the electrical motor driven pump, minimizing internal leakage of hydraulic fluid in the system can be very important. A large amount of leakage can require the electrical motor driven pump to turn off and on frequently. Turning the electrical pump on and off frequently reduces the life of several components including the electrical motor, the hydraulic pump, hydraulic system parts, as well as electrical power generator system components since driving the electrical motor can generate a high in rush current voltage and hydraulic pressure spikes.

In the event of a pump and/or electrical system failure, accumulators hold hydraulic fluid volume enough to stop the aircraft on the ground. Accumulator sizing is driven by internal leakage of the hydraulic system.

Also, most business jets use anti-skid control systems. Most anti-skid control systems use hydraulically operated servo-valves. Since most servo-valves use jet pipe and nozzle-flapper mechanisms, the internal hydraulic leakage is relatively high. Typically, electrically driven shut-off valves can be used to prevent internal leakage for the servo-valve. Brake metering valves can also create internal leakage.

One means to reduce internal leakage is using a shut-off valve upstream of the brake metering valve. The shut-off valve can reduce the internal leakage. Electronic solenoids can be used to drive the shut-off valve. Electronic solenoid valves that open and close hydraulic fluid flow into the brake metering valves step in a manner that creates hydraulic pressure spikes to the brake system and large acoustic noise can be created each time the shut-off valve opens and closes.

SUMMARY

An example of a shut-off valve that can overcome at least some of the aforementioned shortcomings includes a housing, a first valve seat, a second valve seat, a spool, a poppet, a first piston, and a first spring. The housing can include a bore, a master cylinder port, a pressure supply port, a system pressure port, and a return port. Each port can connect with the bore, and the bore includes a valve seat section and a piston receiving section. The valve seat section is connected with the system pressure port, and the piston receiving section is connected with the return port. The first valve seat is disposed in the valve seat section of the bore between the pressure supply port and the system pressure port. The second valve seat is disposed in the valve seat section of the bore between the system pressure port and the master cylinder port. The spool can be disposed in the bore. The poppet is on the spool, and the poppet can move with the spool. The poppet is disposed in the valve seat section for movement between the first valve seat and the second valve seat. The first piston can be disposed in the piston receiving section of the bore and connect with the spool for movement with the spool. The first spring is disposed in the piston receiving section of the bore and biases the first piston and the poppet in a first direction towards the first valve seat. When pressure at the master cylinder port overcomes a biasing force of the first spring and pressure at the return port, the first piston and the poppet travel in a second direction.

A hydraulic system for an aircraft that can overcome at least some of the aforementioned shortcomings includes a master cylinder, a wheel brake, a pressure supply, a reservoir, and a shut-off valve in communication with the master cylinder, the wheel brake, the pressure supply and the reservoir. The shut-off valve can include a seal that is configured to preclude fluid flow between the pressure supply and the reservoir through the valve. The shut-off valve can be operable in a first position which blocks fluid flow between the pressure supply and the wheel brake through the valve and a second position which allows fluid flow between the pressure supply and the wheel brake through the valve. Fluid pressure from the master cylinder can control operation of the valve between the first position and the second position. Failure of the seal can result in fluid flow from the brake pressure supply toward the master cylinder.

Another example of a shut-off valve includes a housing, a spool, a poppet, a valve seat, a seal, a first piston, and a second piston. The housing can include a bore, a master cylinder port, a pressure supply port, a brake pressure port, and a return port. Each port can connect with the bore. The spool can be disposed in the bore. The poppet can be disposed on the spool, and the poppet can move with the spool. The valve seat can be disposed in the bore between the pressure supply port and the brake pressure port. The poppet can seal against the valve seat to block fluid flow through the bore from the pressure supply port toward the brake pressure port. The seal can cooperate with the spool and the housing to block fluid flow through the bore from the pressure supply port and the brake pressure port toward the master cylinder port. The first piston can be disposed in the bore and connected with the spool for movement with the spool. The second piston can be disposed in the bore. The second piston can include a second piston passage that receives the first piston. The first piston can cooperate with the second piston to block fluid flow through the bore from the master cylinder toward the return port. The second piston can cooperate with the housing to block fluid flow through the bore from the master cylinder port toward the return port.

DETAILED DESCRIPTION

Figure 1:
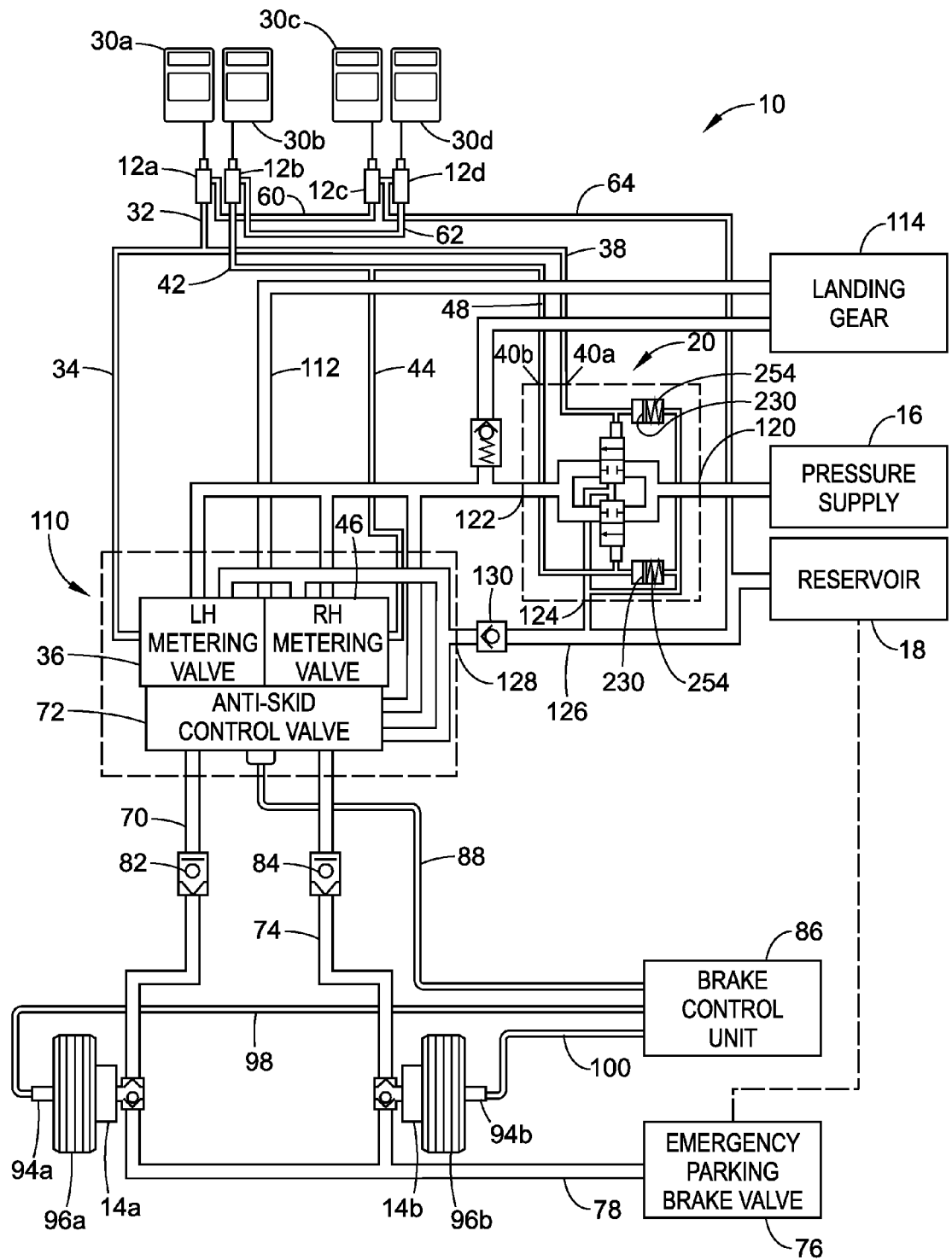
FIG. 1 is a schematic depiction of a hydraulic system for an aircraft.

The descriptions and drawings herein are merely illustrative and various modifications and changes can be made in the structures disclosed without departing from the scope of the appended claims. Various identified components of a hydraulic system and a shut-off valve disclosed herein are merely terms of art and may vary from one manufacturer to another. The terms should not be deemed to limit the present disclosure or the appended claims. The drawings are shown for purposes of illustrating one or more exemplary embodiments and are not for purposes of limiting the appended claims. All references to direction and position, unless otherwise indicated, refer to the orientation of the components illustrated in the drawings and should not be construed as limiting the appended claims.

FIG. 1 schematically depicts a hydraulic system 10 for an aircraft. The hydraulic system 10 includes a master cylinder, and in the depicted example, the hydraulic system 10 includes a pilot left-hand master cylinder 12a, a pilot right-hand master cylinder 12b, a co-pilot left-hand master cylinder 12c, and a co-pilot right-hand master cylinder 12d. The hydraulic system 10 also includes a wheel brake, which in the depicted embodiment includes a left-hand wheel brake 14a and a right-hand wheel brake 14b. The hydraulic system 10 also includes a pressure supply 16, which can be an electrical motor driven hydraulic pump. The hydraulic system 10 also includes a reservoir 18, which can be a vented reservoir or tank or a pressurized reservoir or tank. The hydraulic system 10 also includes a shut-off valve 20 that is in communication with the master cylinders 12a-12d, the wheel brakes 14a, 14b, the pressure supply 16 and the reservoir 18.

The pilot left-hand master cylinder 12a is operated by a pilot left-hand pedal 30a. The pilot right-hand master cylinder 12b is operated by a pilot right-hand pedal 30b. The co-pilot left-hand master cylinder 12c is operated by a co-pilot left-hand pedal 30c. The co-pilot right-hand master cylinder 12d is operated by a co-pilot right-hand pedal 30d. A left-hand master cylinder outlet line 32 connects with the pilot left-hand master cylinder 12a. The left-hand master cylinder outlet line 32 branches to connect with a left-hand brake metering valve supply line 34, which connects with a left-hand brake metering valve 36, and a left-hand shut-off valve supply line 38, which connects with a left-hand master cylinder port 40a of the shut-off valve 20. A right-hand master cylinder outlet line 42 connects with the pilot right-hand master cylinder 12b. The right-hand master cylinder outlet line 42 branches to connect with a right-hand brake metering valve supply line 44, which connects with a right-hand brake metering valve 46, and a right-hand shut-off valve supply line 48, which connects with a right-hand master cylinder port 40b of the shut-off valve 20. A first connecting line 60 connects the co-pilot left-hand master cylinder 12c to the pilot left-hand master cylinder 12a. Accordingly, upon actuation of the co-pilot left-hand pedal 30c, fluid exits the pilot left-hand master cylinder 12a through the left-hand master cylinder outlet line 32. Similarly, a second connecting line 62 connects the co-pilot right-hand master cylinder 12d to the pilot right-hand master cylinder 12b. A master cylinder return line 64 also connects with the co-pilot left-hand master cylinder 12c and the co-pilot right-hand master cylinder 12d, which connects the master cylinders to the reservoir 18.

A left-hand brake supply line 70 connects the left-hand brake 14a to an anti-skid control device 72. A right-hand brake supply line 74 connects the right-hand brake 14b to the anti-skid control device 72. Both the left-hand brake 14a and the right-hand brake 14b connect with an emergency parking brake valve 76 via a return line 78. The emergency parking brake valve 76 can communicate with the reservoir 18. A first hydraulic fuse 82 can be provided on the left-hand brake supply line 70 between the anti-skid control device 72 and the left-hand brake 14a. A second hydraulic fuse 84 can be provided on the right-hand brake supply line 74 between the anti-skid control valve 72 and the right-hand brake 14b. The anti-skid control valve 72 can be controlled by a brake control unit 86. An electrical line 88 can run between the anti-skid control valve 72 and the brake control unit 86 to supply signals to the anti-skid control valve. A left-hand wheel speed transducer 94a and a right-hand wheel speed transducer 94b can be provided for each respective wheel 96a and 96b. A first electrical line 98 can connect between the brake control unit 86 and the left-hand wheel speed transducer 94a. A second electrical line 100 can connect the brake control unit 86 and the right-hand wheel speed transducer 94b.

A power-brake anti-skid control valve 110, which can include the left-hand brake metering valve 36, the right-hand brake metering valve 46 and the anti-skid control valve 72, can also provide hydraulic fluid via line 112 to landing gear 114 of the aircraft.

With continued reference to FIG. 1, the brake shut-off valve 20 can include a pressure supply port 120, which is connected to the pressure supply 16, a system pressure port, hereinafter referred to as a brake pressure supply port 122, which is connected to the power brake/anti-skid control valve 110, and a return port 124, which is connected to the reservoir 18. A return line 126 can connect with a return port 128 of the power brake/anti-skid control valve 110 and the return port 124 of the shut-off valve 20. A check valve 130 can be provided between the return port 128 of the power brake/anti-skid control valve 110 and the return port 124 of the shut-off valve 20 to block fluid flow from the return port 124 of the shut-off valve 20 toward the return port 128 of the power brake/anti-skid control valve 110.

The shut-off valve 20 is operable in a first position, which blocks fluid flow between the pressure supply 16 and the wheel brakes 14a, 14b through the shut-off valve 20. The shut-off valve 20 is also operable in a second position, which allows fluid flow between the pressure supply 16 and the wheel brakes 14a and 14b through the shut-off valve 20. Fluid pressure from the master cylinders 12a, 12b, 12c and 12d controls operation of the shut-off valve 20 between the first position and the second position. By using master cylinder pressure to open and close the shut-off valve 20, hydraulic supply to the power brake/anti-skid control valve 110 can be gradually increased according to the brake pedal movement. This gradual increase of hydraulic supply prevents hydraulic spikes and acoustic noise. By using master cylinder pressure to open and close passages within the shut-off valve 20, partial strokes on the pedals 30a, 30b, 30c and 30d can result in pressure being supplied from the pressure supply 16 toward the brakes 14a and 14b. In other words, the second position of the shut-off valve 20 need not supply unconstrained or full fluid flow between the pressure supply 16 and the brake pressure port 122.

When the pedal 30a or the pedal 30c is pedaled, the shut-off valve 20 moves into the second, open, position. When in the second position, the pressure to brake the left hand wheel 96a is sourced from the pressure supply 16 to the left hand wheel brake 14a through the shut-off valve 20, the left hand metering valve 36 and the anti-skid control valve 72. This brake force depends on the force on the pedal 30a or 30c. The shut-off valve 20 moves back to the first position, which is closed, and the left hand wheel 96a is released by the left hand brake 14a when the pedal 30a or 30c is not footed. Similarly, when the pedal 30b or the pedal 30d is pedaled, the shut-off valve 20 moves into the second position. When in the second position, the pressure to brake the right hand wheel 96b is sourced from the pressure supply 16 to the right hand wheel brake 14b through the shut-off valve 20, the right hand metering valve 46 and the anti-skid control valve 72. This brake force depends on the force on the pedal 30b or 30d. The shut-off valve 20 moves back to the first position, which is closed, and the right hand wheel 96b is released by the right hand brake 14b when the pedal 30b or 30d is not footed.

Figure 2:
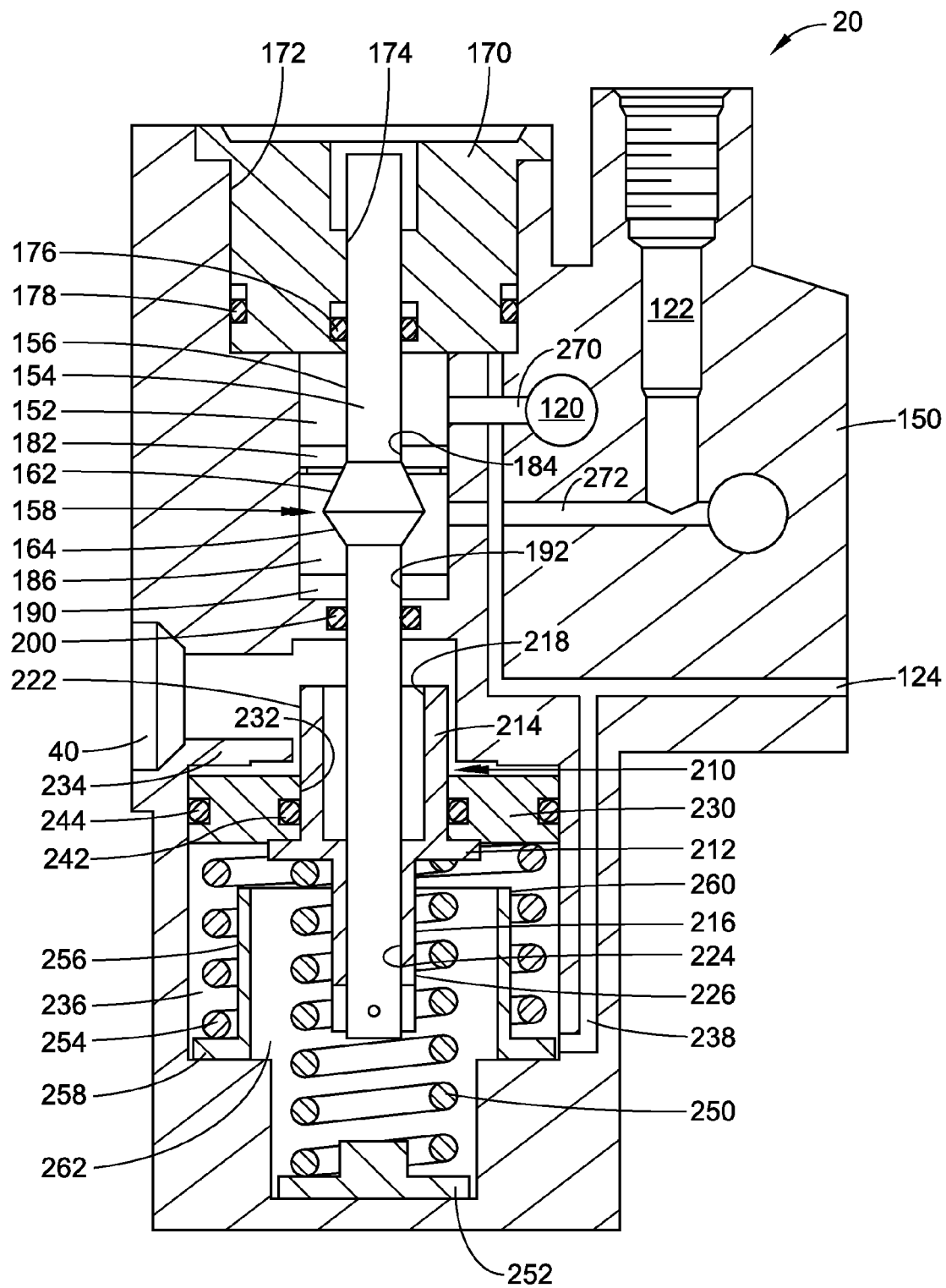
FIG. 2 is a schematic depiction of a shut-off valve for the hydraulic system depicted in FIG. 1.

With reference to FIG. 2, the shut-off valve 20 includes a housing 150 including a bore 152. The bore 152 can formed in the housing 150 by boring or removing material from the housing to provide a passageway through which fluid can flow. Alternatively, the bore 152 can be formed in a casting operation such that a passage is formed through which fluid can flow. The housing 150 further includes the master cylinder ports 40a and 40b (one master cylinder port 40 is shown in FIG. 2), the pressure supply port 120, the brake pressure port 122, and the return port 124. Each of the ports connects with the bore 152.

The shut-off valve 20 further includes a spool 154 disposed in the bore 152. In the illustrated embodiment, the spool 154 is generally an elongate cylinder and includes an outer surface 156. A poppet 158 is on the spool 154 and moves with the spool 154. In the illustrated embodiment, the poppet 158 includes a first (upper) valve face 162 and a second (lower) valve face 164. The poppet 158 enlarges a portion of the spool 154 to selectively block flow of fluid through the bore 152 in a manner that will be described in more detail below.

The shut-off valve 20 also includes a cap 170, which in the depicted embodiment is generally cylindrical in configuration. As illustrated in FIG. 2, the cap 170 fits inside an upper counterbore section 172 of the bore 152. The cap 170 includes a cylindrical central passage 174 that receives a portion of the spool 154. An inner cap seal 176 contacts the cap 170 and the spool 154 to prevent fluid flow from the bore 152 to ambient. An outer cap seal 178 contacts the cap 170 and the housing 150 to also prevent fluid flow between the bore 152 and ambient. The spool 154 is movable within the passage 174 with respect to the cap 170 while maintaining a seal between the spool 154 and the cap 170 at the seal 176.

The shut-off valve 20 further includes a first valve seat 182 disposed in the bore 152 between where the pressure supply port 120 connects with the bore 152 and where the brake pressure port 122 connects with the bore 152. The first valve seat 182 can be an annular metal disc-shaped piece that includes a central passage 184 that receives the spool 154. The first valve seat 182 is disposed in a valve seat section 186 of the bore 152 between where the pressure supply port 120 connects with the bore 152 and where the brake pressure port 122 connects with the bore 152. The poppet 162 seals against the first valve seat 182 to block fluid flow through the bore 152 from the pressure supply port 120 toward the brake pressure port 122. More particularly, the first valve face 162 of the poppet 158 seats against the first valve seat 182 to block the central passage 184 to block fluid flow through the bore 152 from the pressure supply port 120 toward the brake pressure port 122.

The shut-off valve 20 also includes a second valve seat 190, which can be disposed in the valve seat section 186 of the bore 152. The second valve seat 190 can be an annular metal disc-shaped piece that includes a central passage 192 that receives the spool 154. The second valve seat 190 is disposed in the bore 152 between where the pressure supply port 120 connects with bore and where the master cylinder port 40 connects with the bore. Additionally, the second valve seat 190 is disposed in the bore 152 between where the brake pressure port 122 connects with bore 152 and where the master cylinder port 40 connects with the bore 152.

The shut-off valve 20 also includes a seal 200 to preclude fluid flow between the pressure supply 16 (FIG. 1) and the reservoir 18 (FIG. 1) through to valve 20. The seal 200 cooperates with the spool 154 and the housing 150 to block fluid flow through the bore 152 from the pressure supply port 120 and the brake pressure port 122 toward the master cylinder port 40. In the depicted embodiment, the seal 200 contacts the spool 154 and the housing 150 and is positioned below the second valve seat 190. The seal 200 can be an O-ring seal.

The shut-off valve 20 also includes an inner (first) piston 210 disposed in the bore 152 and connected with the spool 154 for movement with the spool 154. In the illustrated embodiment, the inner piston 210 includes a base 212, an upper extension 214, which extends away from the base 212 in a first direction (toward the cap 170 in FIG. 2), and a lower extension 216, which extends away from the base in a second direction. In the illustrated embodiment, the base 212 can be a generally circular disc-shaped member. The outer diameter of the base 212 is larger than the outer diameter of the upper extension 214. The upper extension 214 can be generally cylindrical in configuration and extend in a generally normal direction from the base 212. The inner diameter of the upper extension 214 is larger than the outer diameter of the spool 154. The outer diameter of the upper extension 214 and the inner diameter of the outer piston 230 are nearly the same. The lower extension 216 can also be generally cylindrical in configuration and include an inner surface 224 and an outer surface 226. The lower extension 216 can also extend in a generally normal direction from the base 212. The inner diameter of the lower extension 216 and the outer diameter of the spool 154 are nearly the same.

The shut-off valve 20 also includes an outer (second) piston 230 disposed in the bore 152. In the illustrated embodiment, the second piston 230 is generally cylindrical in configuration and includes a second piston passage 232 that receives the upper extension 214 of first piston 210. The diameter of the base 212 of the first piston 210 is larger than the diameter of the second piston passage 232. In the illustrated embodiment, the first piston 210 cooperates with the second piston 230 to block fluid flow through the bore 152 from the master cylinder port 40 toward the return port 124. The length of the upper extension 214 is longer than the length of the second piston passage 232 such that movement of the first piston 210 relative to the second piston 230 maintains sealing between the first piston 210 and the second piston 230 through the second piston passage 232. Also, the second piston 230 cooperates with the housing 150 to block fluid flow through the bore 150 from the master cylinder port 40 toward the return port 124.

In the illustrated embodiment, the housing 150 includes a shoulder 234. A piston receiving section 236 of the bore 152 is defined below the shoulder 234 (per the orientation shown in FIG. 2). The outer diameter of the outer piston 230 and the outer diameter of the piston receiving section 236 are nearly the same. The housing 150 also includes a return line passage 238 that connects with the piston receiving section 236 of the bore 152 below the second piston 230 (per the orientation shown in FIG. 2) and the return port 124. An inner piston seal 242 contacts the inner piston 210 and the outer piston 230 to block fluid flow from the master cylinder port 40 toward the return line port 124 (and more specifically between the master cylinder port 40 and the return line passage 238) through the bore 152. An outer piston seal 244 contacts the outer piston 230 and the housing 150 to block fluid flow between the master cylinder port 40 and the return port 124 (and more specifically, the return line passage 238) through the bore 152.

The shut-off valve 20 also includes a first (inner) spring 250 biasing the first piston 210 and the poppet 158 in a first direction toward the first valve seat 182. The inner spring 250 is disposed in the piston receiving section 236 of the bore 152. An inner spring retainer 252 connects with the housing 150 to attach the inner spring 250 to the housing 150. The inner spring 250 acts against the housing to bias the first piston 210 in the first direction. The inner diameter of the inner spring 250 is larger than the outer diameter of the lower extension 216 and the outer diameter of the inner spring 250 is smaller than the outer diameter of the base 212.

The shut-off valve 20 also includes a second (outer) spring 254 biasing the second piston 230 in the first direction. The inner diameter of the piston receiving section 236 is larger than the outer diameter of the outer spring 254. The outer spring 254 is also disposed within the piston receiving section 236 of the bore 152. An outer spring retainer 256 connects with the housing 150 to connect the outer spring 254 to the housing 150. The outer spring retainer 256 includes a base 258, which can be generally annular, and an extension 260, which can be cylindrical, that extends upwardly from the base 258 in the first direction. The outer diameter of the extension 260 is larger than the outer diameter of the base 212. The inner diameter of the outer spring 254 is larger than the outer diameter of the extension 260. The shoulder 234 retains the second piston 230 against the biasing force of the outer spring 254 so that the outer piston 230 does not travel to block the master cylinder port 40. The outer spring retainer 256 is hollow and includes a passage 262 that receives the inner piston 210 and the inner spring 250. The passage 262 has a diameter that is greater than the diameter of the base 212 of the inner piston 210, which allows the inner piston 210 to travel within the passage 262 and be moveable with respect to the outer spring retainer 256. The upper extension 260 can also limit movement of the outer piston 230 in a second direction, which is opposite the first direction, which is the direction in which the outer spring 254 biases the outer piston 230. The spool 154, the upper extension 214, the lower extension 216, the base 212, the inner spring 250, the outer spring 254, the outer spring retainer 256, the base 258, the outer spring 230 and the piston receiving section 236 are disposed concentrically. The inner spring 250, which is grounded in the inner spring retainer 252, biases the inner piston 210 toward the first direction. The outer spring 254, which is grounded in the base 258, biases the outer piston 230 toward the first direction.

Operation of the shut-off valve 2Q will now be described in more detail. Normally, the first valve face 162 contacts the first valve seat 182, because the inner spring 250 biases the inner piston 210 and the spool 154 toward the first direction. This is the closed condition of the shut-off valve 20. In the closed condition, the hydraulic fluid does not flow from the pressure supply port 120 to the brake pressure port 122. The shut-off valve 20 is designed such that fluid pressure at the master cylinder port 40 overcomes the biasing force of the inner spring 250 and a return line pressure at the return port 124 to urge the poppet 158 from the first valve seat 182 allowing fluid to flow through the bore 152 from the pressure supply port 120 towards the brake pressure port 122.

Fluid pressure from the master cylinder 12a, 12b, 12c or 12d enters the shut-off valve 20 at the master cylinder port 40. The seal 200 precludes fluid flow from the master cylinder port 40 toward the pressure supply port 120 and the brake pressure port 122. The inner surface 218 of the inner piston 210 is spaced from the outer surface 156 of the spool 154 such that the fluid from the master cylinder port 40 can enter between the inner surface 218 of the inner piston 210 and the outer surface 156 of the spool 154 to overcome the biasing force of the inner spring 250 and the return line pressure at the return port 124. The spool 154 and the inner piston 210 travel integrally. With the first valve face 162 unseated from the valve seat 182, fluid passes from the pressure supply port 120 through a pressure supply port passage 270 into the bore 152, through the passage 184 in the valve seat 182 and into a brake pressure port passage 272, which is connected with the brake pressure port 122.

The stroke of the inner piston 210 is limited by the second valve face 164 seating against the second valve seat 190. Volume compensation is accomplished by movement of the outer piston 230 against the biasing force of the outer spring 254 and the return port pressure at the return port 124, because when the outer piston 230 moves down, inter space between the outer piston 230 and the shoulder 234 enlarges. As seen in FIG. 2, the outer surface 222 of the inner piston 210 is spaced from the shoulder 234 such that fluid can enter the region of the bore 152 below the shoulder (per the orientation shown in FIG. 2). Accordingly, the outer piston 230 and the housing can operate as an accumulator (see FIG. 1). When the force by the master cylinder pressure of the master cylinder port 40 overtakes the force by the inner spring 250 and the return pressure of the return port 124, the spool 154 and the inner piston 210 move integrally in a direction toward the second direction. At first, the second piston 230 does not move. When the force by the master cylinder pressure of the master cylinder port 40 overtakes the force by the inner spring 250, the outer spring 254 and the return pressure of the return port, the spool 154, the inner piston 210 and the outer piston 230 move integrally in a direction toward the second direction. Thus, this mechanism realizes a volume compensator easily. The shut-off valve 20 gets into the open condition when the first valve face 162 moves away from the first valve seat 182 with a travel of the spool 154. Then, the hydraulic fluid flows from the pressure supply port 120 to the brake pressure port 122. The stroke of the poppet 158 and the inner piston 210 are limited by the distance between the first valve seat 182 and the second valve seat 190.

A failure of the seal 200 results in fluid passing from the pressure supply port 120 (and the brake pressure port 122) towards the master cylinder port 40. Then, the pressure in the master cylinder port 40 increases and the second valve face 164 of the poppet 158 moves toward the second valve seat 190. When the second valve face 164 seats against the second valve seat 190, further fluid flow from the brake pressure supply port 120 and the brake pressure port 122 toward the master cylinder port 40 is blocked. Failure of the seal 200 can result in uncommanded application of 70% of the brake pressure at the left-hand brake 14a (FIG. 1) and the right-hand brake 14b (FIG. 1). The brake pressure increases until the second valve face 164 contacts the second valve seat 190. In this hydraulic brake system, the 70% of the brake pressure at the brake 14a, 14b is provided until the second valve face 164 contacts the second valve seat 190 without brake pedal operation by the pilots. In this embodiment, the values 70% is merely example. This percentage is decided in response to the distance between the second valve face 164 and the second valve seat 190, the spring force of the inner spring 250 and the like. Therefore, the percentage of the brake pressure is decided for each hydraulic brake system. The pilot of the aircraft is then able to control braking from 70% to 100% by pedal the brake pedals. If the pressure in the pressure supply port 120 continued to flow into the master cylinder port 40, as in other designs, the unintended full brake condition might have occurred, which is undesirable. Since the second valve seat 190 is made of metal in the illustrated embodiment, the failure of the metal-to-metal contact between the second valve face 164 and the second valve seat 190 is unlikely. The failure of both the valve seat 190 and the seal 200 is highly unlikely due to the nature of a metal-to-metal seal between the second valve face 164 and the second valve seat 190.

A hydraulic system for an aircraft and a shut-off valve for such a hydraulic system have been described above with particularity. Modifications and alterations will occur to those upon reading and understanding the preceding detailed description. The appended claims are not to be limited only to the embodiment described above.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A shut-off valve comprising:
a housing including a bore, a master cylinder port, a pressure supply port, a system pressure port, and a return port, wherein each port connects with the bore and the bore includes a valve seat section and a piston receiving section, wherein the valve seat section is connected with the system pressure port, wherein the piston receiving section is connected with the return port;
a first valve seat disposed in the valve seat section of the bore between the pressure supply port and the system pressure port;
a second valve seat disposed in the valve seat section of the bore between the system pressure port and the master cylinder port;
a spool disposed in the bore;
a poppet on the spool, wherein the poppet moves with the spool and is disposed in the valve seat section for movement between the first valve seat and the second valve seat;
a first piston disposed in the piston receiving section of the bore and connected with the spool for movement with the spool;
a first spring disposed in the piston receiving section of the bore and biasing the first piston and the poppet in a first direction towards the first valve seat, wherein when pressure at the master cylinder port overcomes a biasing force of the first spring and pressure at the return port the first piston and the poppet travel in a second direction; and
a second piston and a second spring each disposed in the piston receiving section of the bore and, the second piston including a second piston passage that receives the first piston, the second spring biasing the second piston in the first direction, the second piston travels with the first piston and the spool toward the second direction when the pressure at the master cylinder port is larger than a total force of the first spring, the second spring and pressure at the return port.

2. The shut-off valve of claim 1, further comprising a seal between the second valve seat and the master cylinder port, wherein the seal cooperates with the spool and the housing to block fluid flow through the bore from the pressure supply port and the system pressure port toward the master cylinder port.

3. The shut-off valve of claim 1 in communication with a master cylinder, a wheel brake, a pressure supply and a reservoir
wherein the valve seat section is connected with the wheel brake, wherein the piston receiving section is connected with the reservoir;
when the poppet seals against the first valve seat fluid flow from the pressure supply to the wheel brake is blocked, wherein when pressure from the master cylinder overcomes the biasing force of the first spring and pressure at the return port connected with the reservoir the first piston and the poppet travel in the second direction away from the first valve seat.

4. The shut-off valve of claim 3 wherein the master cylinder, the wheel brake, the pressure supply and the reservoir are comprised within a hydraulic system for an aircraft.

5. A shut-off valve comprising:
a housing including a bore, a master cylinder port, a pressure supply port, a system pressure port, and a return port, wherein each port connects with the bore and the bore includes a valve seat section and a piston receiving section, wherein the valve seat section is connected with the system pressure port, wherein the piston receiving section is connected with the return port;
a first valve seat disposed in the valve seat section of the bore between the pressure supply port and the system pressure port;
a second valve seat disposed in the valve seat section of the bore between the system pressure port and the master cylinder port;
a spool disposed in the bore;
a poppet on the spool, wherein the poppet moves with the spool and is disposed in the valve seat section for movement between the first valve seat and the second valve seat;
a first piston disposed in the piston receiving section of the bore and connected with the spool for movement with the spool; and
a first spring disposed in the piston receiving section of the bore and biasing the first piston and the poppet in a first direction towards the first valve seat, wherein when pressure at the master cylinder port overcomes a biasing force of the first spring and pressure at the return port the first piston and the poppet travel in a second direction,
wherein the first piston includes a first extension and a second extension extending in opposite directions from a base, wherein an inner diameter of the first extension is larger than an outer diameter of the spool and a space between the inner diameter of the first extension and the outer diameter of the spool is connected with the master cylinder port.

6. A shut-off valve comprising:
a housing including a bore, a master cylinder port, a pressure supply port, a system pressure port, and a return port, wherein each port connects with the bore and the bore includes a valve seat section and a piston receiving section, wherein the valve seat section is connected with the system pressure port, wherein the piston receiving section is connected with the return port;
a first valve seat disposed in the valve seat section of the bore between the pressure supply port and the system pressure port;
a second valve seat disposed in the valve seat section of the bore between the system pressure port and the master cylinder port;
a spool disposed in the bore;
a poppet on the spool, wherein the poppet moves with the spool and is disposed in the valve seat section for movement between the first valve seat and the second valve seat;
a first piston disposed in the piston receiving section of the bore and connected with the spool for movement with the spool;
a first spring disposed in the piston receiving section of the bore and biasing the first piston and the poppet in a first direction towards the first valve seat, wherein when pressure at the master cylinder port overcomes a biasing force of the first spring and pressure at the return port the first piston and the poppet travel in a second direction; and an inner piston seal disposed between the first piston and a second piston and an outer piston seal disposed between the second piston and the housing.

\* \* \* \* \*